Sept. 18, 1934.    H. H. TRACY    1,973,937
FLASH LIGHT ATTACHMENT FOR CAMERAS
Filed Feb. 9, 1932    2 Sheets-Sheet 1
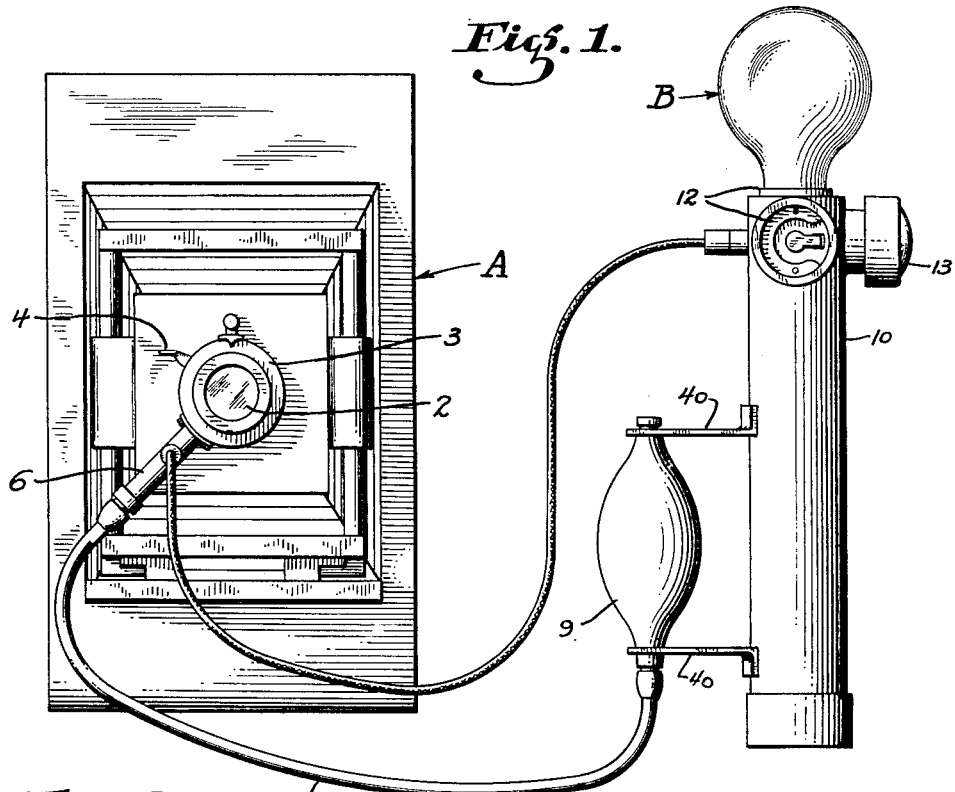
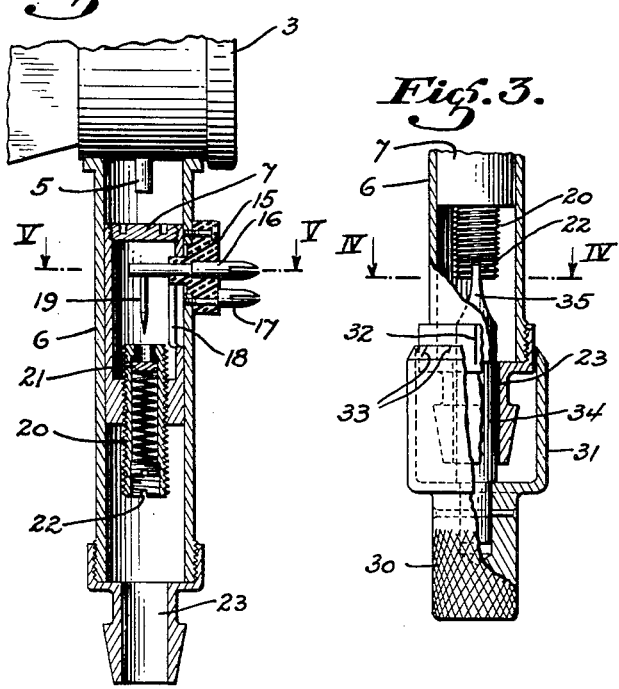
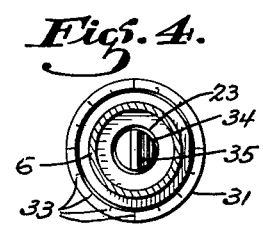
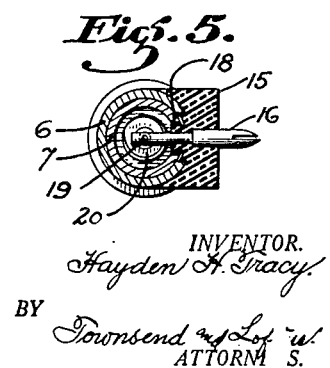
INVENTOR.
Hayden H. Tracy
BY Townsend
ATTORNEYS.

Sept. 18, 1934.    H. H. TRACY    1,973,937
FLASH LIGHT ATTACHMENT FOR CAMERAS
Filed Feb. 9, 1932    2 Sheets-Sheet 2
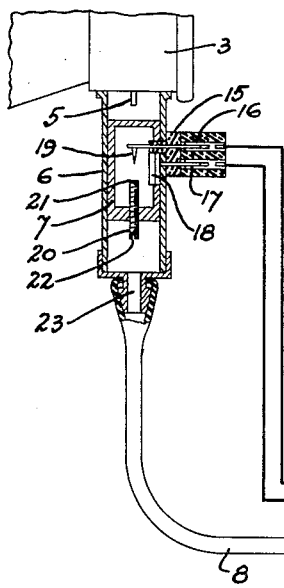
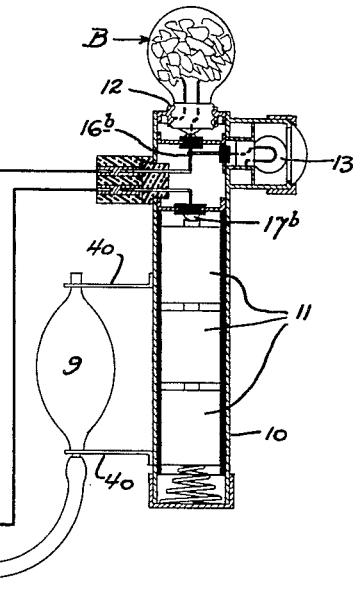
Fig. 6.
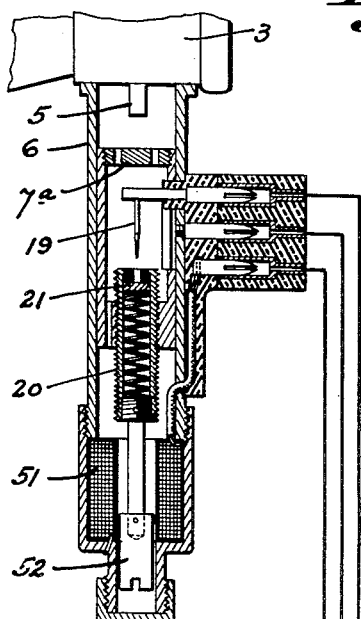
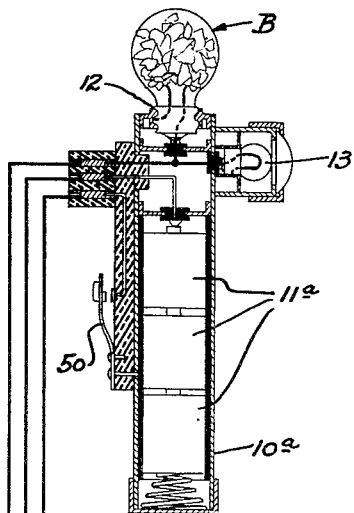
Fig. 7.
INVENTOR.
Hayden H. Tracy.
BY
Townsend and Loftus
ATTORNEYS.

Patented Sept. 18, 1934

1,973,937

UNITED STATES PATENT OFFICE 1,973,937

FLASH LIGHT ATTACHMENT FOR CAMERAS

Hayden H. Tracy, San Francisco, Calif.

Application February 9, 1932, Serial No. 591,824

3 Claims. (Cl. 67—29)

This invention relates to a flash-light attachment for cameras and especially to an attachment whereby an electric circuit may be closed through a photo-flash bulb in synchronism with the actuation of a shutter on a camera.

The taking of flash-light pictures is a fairly simple procedure when working in total darkness, as it is only necessary to turn on the lights or otherwise illuminate the scene to be taken while focusing the camera and then turn off the lights and open the shutter so as to obtain an exposure when the flash-light is set off. An entirely different problem is, however, presented when taking flash-light pictures when semi-light conditions are encountered—for instance, when taking snapshot pictures of street scenes, etc., where there are bright street lights, store windows, flashing signs, moving automobile headlights, etc., as such lights will register and blur or streak the film the moment the shutter is opened, as the shutter must be opened prior to setting off the flash-light and must be closed thereafter.

The object of the present invention is to generally improve and simplify the construction and operation of flash-lights, and particularly to provide a flash-light which is adapted to be synchronized with the shutter so that the shutter may be snapped in the usual manner and the flash-light automatically set off so as to give its greatest brilliance or light when the shutter reaches maximum open position, thus eliminating opening of the shutter prior to setting off of the flash-light and closing of the shutter thereafter.

The flash-light attachment is shown by way of illustration in the accompanying drawings, in which—

Fig. 1 is a front view of a standard form of camera, showing the attachment of the flashlight.

Fig. 2 is an enlarged sectional view of a pneumatic mechanism whereby the trigger arm which operates the shutter is actuated.

Fig. 3 is an enlarged view partially in section, showing a micrometer form of screw driver for adjusting the electric circuit making and breaking mechanism.

Fig. 4 is a cross section taken on line IV—IV of Fig. 3.

Fig. 5 is a cross section taken on line V—V of Fig. 2.

Fig. 6 is a diagrammatic view showing the electric and pneumatic connections between the camera and the flash-light.

Fig. 7 is another diagrammatic view showing an electric method of actuating the shutter of the camera and for closing a circuit through a photo-flash bulb.

Referring to the drawings in detail and particularly Fig. 1, A indicates a standard form of camera, 2 the lens, and 3 the shutter housing disposed rearwardly of the lens. The shutter mechanism is not illustrated as the present attachment may be applied to shutter mechanisms of different character. Suffice it to say, that the shutter is provided with a setting or cocking lever 4 and a tripping member 5, see Fig. 2, whereby the shutter is actuated. The shutter housing is also provided with a cylinder 6 in which is mounted a plunger 7 and this is pneumatically actuated through a flexible rubber tube or the like, such as shown at 8, and a bulb 9.

The pneumatic mechanism shown is of standard construction. By merely depressing the bulb 9, air under pressure is forced through the tube 8 into one end of the cylinder 6. The pressure forces the plunger 7 upwardly in the cylinder and as such causes engagement with the trigger member and, when this is rocked by engagement of the plunger, the shutter is automatically opened and closed, as the spring whereby it is actuated has previously been set or cocked by means of the lever 4. The purpose of the present invention is to provide means whereby a photo-flash bulb, such as indicated at B, may be set off during the opening and closing period of the shutter. This is accomplished as follows:

An ordinary flash-light housing is employed as indicated at 10. This contains a number of dry cells, such as indicated at 11, see Fig. 6. One end of the housing is provided with one or more sockets, such as indicated at 12, and one or more photo-flash bulbs, such as indicated at B, may thus be inserted. The flash-light housing also contains a pilot light 13 and means are employed for simultaneously closing the circuit through the pilot light and the photo-flash bulb B. The means employed are best illustrated in Fig. 2. It consists of an insulating member 15 screwed, or otherwise secured, to one side of the cylinder 6. Extending through this insulating block are two terminal members 16 and 17. The terminal 17 is grounded to the cylinder 6, while the other terminal extends into the plunger and is insulated therefrom. The plunger is slotted, as shown at 18, to straddle the terminal 16 and also to permit free movement of the plunger when pneumatically actuated. The terminal 16 carries a contact member 19 and this is adapted to engage an adjustable contact member carried by the plunger. The adjustable contact member consists of a threaded sleeve 20 in which is mounted a spring actuated contact 21. One end of the sleeve is provided with a screw slot, such as shown at 22, and this may be engaged by a screw driver inserted through the lower open end 23 of the cylinder. The position of the adjustable contact 21 with relation to the stationary contact 19 may thus be adjusted, this being important as it is desirable under certain conditions to advance or retard the closing of the circuit through the photo-flash bulb with relation to the full opening period of the shutter.

In actual operation if a picture is to be taken of a street scene where bright lights, etc., are encountered, the photographer can first focus the camera and when ready to take the picture will merely depress the bulb 9. Depression of the bulb causes movement of the plunger within the cylinder 6 and during such movement two things will happen, to-wit, the trip member 5 will be engaged and the shutter will thus automatically open and close, and simultaneously therewith a circuit will be made between the terminals 16 and 17 due to engagement of the contacts 19 and 21. The terminal 17 is connected through a wire 17a with the end terminal 17b of the dry cells, the other terminal of the dry cells being grounded in the usual manner. The terminal 16 is connected through a wire 16a with a terminal 16b and this, in turn, is connected with the socket ends of the photo-flash bulb B and the pilot light 13. One terminal of the flash-light bulb and the pilot light is grounded to the housing and the circuit is thus completed through the flash-light bulb and the pilot light, as the opposite terminal of the dry cells is also grounded to the housing. Hence, by depression of bulb 9 actuation of the shutter is obtained and also a closing of the circuit through the photo-flash bulb, thus producing a flash during the open period of the shutter of sufficient brilliancy to cause exposure of the film.

From the foregoing it will be apparent that when the bulb 9 is compressed, a circuit is completed to the pilot light as well as to the flash-lamps; thus it is possible for the photographer to test the device before inserting the flash-lamps. Such a test is desirable in order that the operation of the shutter and the closing of the circuit may be properly timed. With this construction all necessary adjustments may be made without utilizing flash-lamps for the purpose of conducting experiments. The pilot light is also useful for the purpose of assuring the photographer that all of the electric connections are complete, and also prove the position of the plunger in the cylinder.

It is possible that the plunger may become lodged in a position closing the electric circuit due to dirt in the cylinder or a misalignment of the parts. By operating the device before the flashlamp is inserted in its socket and observing the pilot light, the photographer can prevent the accidental ignition of the flash-lamps. These tests must, of course, be made either before the camera is loaded with film or with the lens opening suitably capped to prevent exposure of the film.

Under normal conditions it is obvious that the greatest intensity of light should be given when the shutter reaches maximum open position, but as there is a time lag between the closing of the circuit and the actual flashing of the bulb an adjustment must be provided to either advance or retard the closing of the circuit. This adjustment is provided, as clearly shown in Fig. 2, by providing the adjustable sleeve 20 and contact member 21 the greatest light intensity may thus be obtained at any time during the open period of the shutter. An adjustment of this character is naturally very sensitive and a micrometer form of screw driver has accordingly been provided. This is best illustrated in Fig. 3. It consists of a head member 30 and a sleeve-like extension 31 which is adapted to slip over the lower end of the cylinder 6. The cylinder is provided with a central marker or indicating line 32 and the end of the sleeve 31 is beveled and is provided with micrometer graduations, such as shown at 33. The head member is, furthermore, provided with a central rod 34 which terminates in a screw driver 35. This rod is, of course, secured to the head member 30 and is insertable through the connection 23 and, when so inserted, the screw driver engages the slotted end 22 of the adjustable sleeve 20 and the sleeve will accordingly be rotated. When the head member 30 is manipulated the amount of rotation is visibly indicated by the micrometer graduations 33 and the finest or most sensitive adjustment desired can thus be obtained.

The flash-light attachment here shown can be attached to practically any standard form of camera. It is convenient to carry and operate as the bulb 9 is attached to the flash-light housing by means of bracket members 40. The bulb, accordingly, functions as a handle for the flash-light housing and the flash-light bulb attached thereto and may be held in one hand while the camera is held in the other, and by merely squeezing the bulb a picture may be quickly taken at any time desired. By providing two or more sockets, such as shown at 12, one or more flash-light bulbs may be simultaneously set off so as to increase or decrease the brilliancy of the flash-light when the picture is to be taken.

In Figs. 1 to 5, inclusive, a pneumatically actuated shutter mechanism is illustrated. Obviously, the trigger mechanism may be electrically actuated, if desired. Such an arrangement is shown in Fig. 7. In that instance, the flash-light housing 10 is provided with a depressible switch 50. This switch, when depressed or closed, closes a circuit through the coil 51 of a solenoid magnet disposed in the lower end of the cylinder 6. The solenoid magnet carries a movable core member 52 and this is connected with a plunger indicated at 7a. This plunger is constructed in a similar manner to that shown in Fig. 2 and functions in a similar manner, hence any further description thereof is thought unnecessary. Suffice it to say, that the dry cells 11a of the casing 10a furnish sufficient current to actuate the solenoid magnet. This, in turn, raises the movable core 52 which is connected with the plunger 7a and, as the plunger 7a is raised, the trigger member will be actuated and an electric circuit will be closed through the photo-flash bulb and the pilot light as previously described.

From the foregoing it will be noted that the shutter actuating mechanism may be pneumatically or electrically actuated and that the actuation of the shutter causes the automatic closing of an electric circuit, which actuates the flash-light, and that this circuit may be advanced or retarded with relation to the movement of the shutter so that synchronous operation between the shutter and the flash-light may be insured.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. The combination with a camera shutter and an actuating member therefor of a cylinder secured to the camera adjacent said member, a hollow plunger in said cylinder, means for moving the plunger into contact with said member to actuate the shutter, an electric circuit for igniting a flash-lamp and a switch for said circuit, said switch comprising a contact member fixed to the cylinder and extending into the plunger and a second contact member carried by the plunger and engageable with the first contact member to close the circuit upon movement of the plunger to a position for actuating the shutter.

2. In a device for simultaneously actuating a camera shutter and closing a circuit to a flash-lamp, a cylinder, a plunger therein adapted upon movement in one direction to engage the actuator of the shutter, a switch for closing said circuit comprising a contact member fixed to the cylinder and a second contact member carried by the plunger, said second contact member having a threaded connection with the plunger for longitudinal adjustment relative thereto, and said cylinder having an opening in alignment with said second contact member for the insertion of an adjusting tool.

3. A device of the character described comprising a cylinder, a plunger therein, a contact member fixed to the cylinder, a second contact member carried by the plunger for engagement with the first contact member upon reciprocation of the plunger, a tube carrying said second contact member and threaded to said plunger for longitudinal adjustment relative thereto, a spring in the tube urging the contact member toward one end thereof and a threaded plug in the other end of the tube to retain said spring in place.

HAYDEN H. TRACY.